Sept. 29, 1925.
L. H. DOE
BEAN CUTTER
Filed Nov. 20, 1924
1,555,106
2 Sheets-Sheet 1
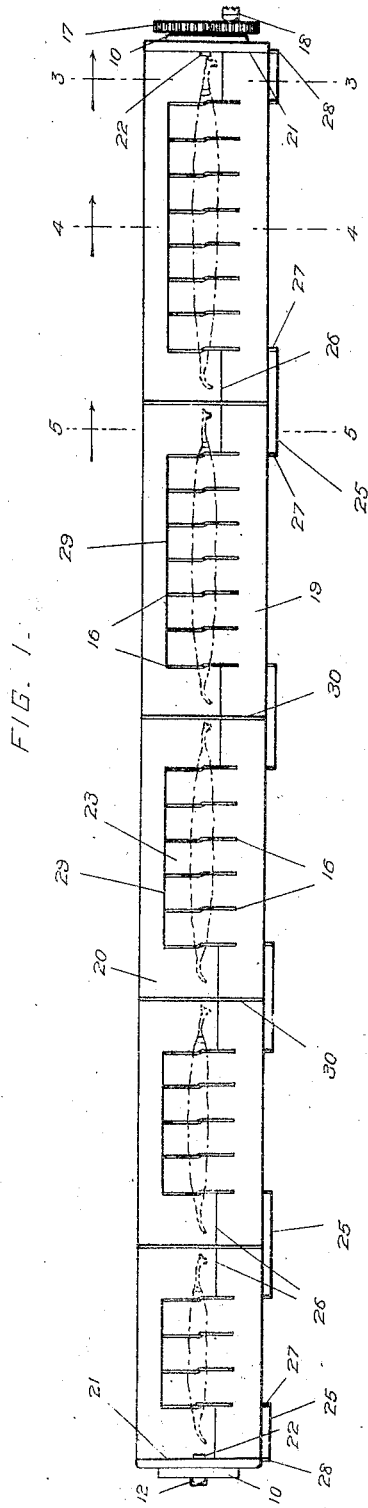
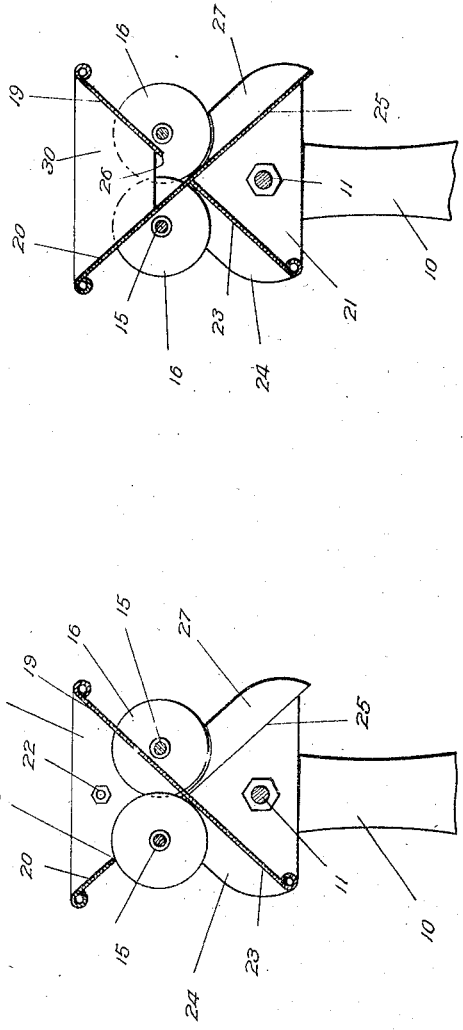
Inventor:
LILLIAN H. DOE,
By Monroe E. Miller
Attorney.

Sept. 29, 1925.
L. H. DOE
BEAN CUTTER
Filed Nov. 20, 1924
1,555,106
2 Sheets-Sheet 2
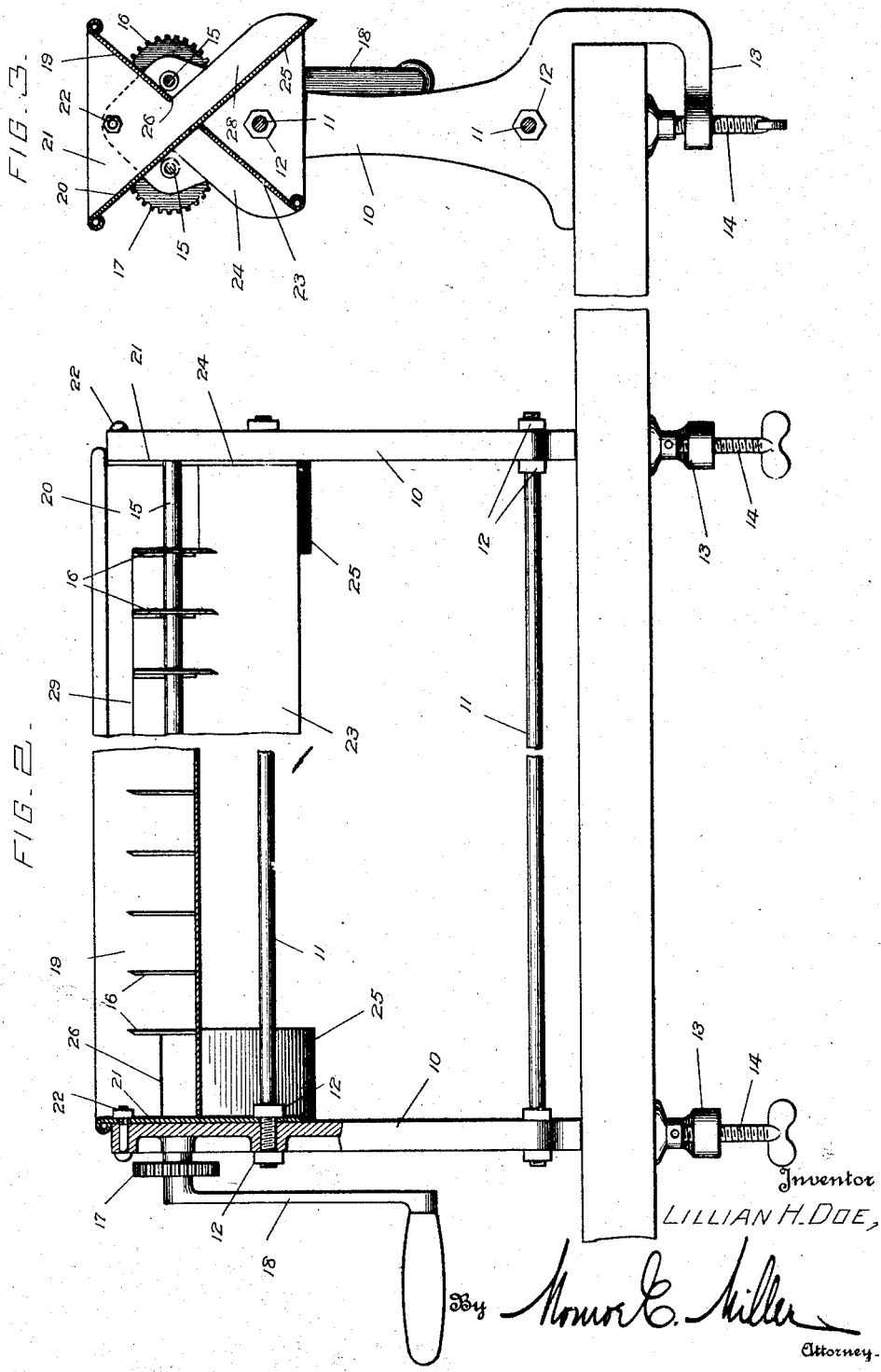
Inventor
LILLIAN H. DOE, Patented Sept. 29, 1925.

1,555,106

UNITED STATES PATENT OFFICE.

LILLIAN HEALD DOE, OF BURNHAM, MAINE.

BEAN CUTTER.

Application filed November 20, 1924. Serial No. 751,075.

*To all whom it may concern:*

Be it known that I, LILLIAN H. DOE, a citizen of United States, residing at Burnham, in the county of Waldo and State of Maine, have invented certain new and useful Improvements in Bean Cutters, of which the following is a specification, reference being had therein to the accompanying drawing.

The present invention relates to machines for cutting beans and similar vegetables, and aims to provide a novel and improved device for that purpose which is simple in construction and operation.

Another object of the invention is the provision of a bean cutter comprising a novel and improved construction whereby the device is convenient and efficient in use, the device snipping the ends off the beans as well as cutting the beans into short lengths for canning or preserving.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a plan view of the improved machine, a portion of the crank handle being broken away.

Fig. 2 is an enlarged view of the machine, partly in side elevation and partly in longitudinal vertical section.

Figs. 3, 4 and 5 are enlarged cross sections on the respective lines 3—3, 4—4 and 5—5 of Fig. 1.

The frame of the machine comprises the end standards 10 connected by vertically spaced longitudinal rods 11 engaging through the standards and secured to said standards by means of nuts 12 threaded on said rods and clamping the standards between them. As shown, the frame is adapted to be clamped to the edge portion of a table top or other support, although the frame can be mounted in different ways. The standards 10 have portions 13 to extend under the edge portion of the table top or similar support and clamping screws 14 are carried by the portions 13 for clamping the standards on the support.

The cutting means comprises parallel longitudinal shafts 15 journaled for rotation in the standards 10 and having cutting disks 16 secured thereon to rotate therewith. The disks of the two shafts are arranged in pairs with the adjacent portions of the disks overlapping to obtain a shearing action. The pairs of disks are arranged in groups, as clearly seen in Fig. 1, and the groups have different numbers of pairs of disks, running, as shown, from four pairs in one group up to eight pairs of disks in the last group. This is for the purpose of accommodating beans or other similar vegetables of different lengths, as will be apparent.

The shafts 15 can be rotated in any suitable manner, either manually or by power. As shown, the shafts 15 are connected to rotate simultaneously, by means of intermeshing gear wheels 17 secured on the shafts, and a crank 18 is secured to one shaft to be rotated by hand, although the cutting disks 16 can be rotated by power if desired.

The machine is provided with hoppers to facilitate feeding the beans to the cutting disks, and means are also provided for separating the ends of the beans from the cut up pods. For this purpose, oppositely inclined plates 19 and 20 are provided, which extend longitudinally of the machine, and they diverge upwardly to form hoppers above the disks for receiving the beans, said plates extending between the shafts 15, and the plate 19 is slotted to accommodate the disks of the corresponding shaft. End plates 21 are secured to the ends of the plates 19 and 20, and are secured to the standards 10 by the nuts 12 of the upper rod 11, and by means of bolts 22 engaging through said plates 21 and standards. The plate 19 projects downwardly beyond the plate 20 to provide a chute 23 extending toward one side for discharging the cut up pieces of the bean pods. The end plates 21 have upstanding flanges 24 at the ends of the chute 23. The plate 20 has chutes 25 extending downwardly beyond the plate 19 through openings 26 with which the plate 19 is formed between the groups of cutting disks and between the end plates 21 and end groups of disks. The chutes 25 have upstanding flanges 27 at their side edges extending downwardly from the corresponding cutting disks, and the end plates 21 have upstanding flanges 28 for the end chutes 25. The chutes 23 and 25 diverge downwardly so as to discharge the tips or ends of the beans and the cut up pods toward opposite sides.

The plate 20 has openings 29 above the plate 19 to accommodate the cutting disks of the corresponding shaft, and to also permit the pieces of the pod to pass down over the chute 23, the openings 29 being of lengths corresponding to the groups of cutting disks.

Partitions 30 are secured between the upper portions of the plates 19 and 20 between the groups of cutting disks, thereby providing separate hoppers for the groups or sets of cutting disks, the hoppers being of different lengths for beams of corresponding lengths.

In using the machine, it is only necessary to drop the beams of different lengths in the corresponding hoppers, and the cutting disks are rotated so that their adjacent portions move downwardly, thereby not only feeding the beams downwardly between the cutting disks of the two shafts, but also cutting the beams into the desired lengths. The end pairs of cutting disks of the several groups or sets will snip off the ends of the beans, and such ends will drop down through the openings 26 and pass down the chutes 25 to one side, while the cut up pieces of the pods will pass down through the openings 29 and down the chute 23 to be discharged at the opposite side of the machine. Thus, the beans are cut up into pieces simultaneously with the cutting off of the ends thereof, and the ends and cut up pieces of the pods are separated and discharged at opposite sides. The cutting disks of the two shafts extend upwardly through slots in the plate 19 and the openings 29 of the plate 20 into the hoppers, and the openings 26 and 29 discharge the ends and pieces of the pods in different directions.

Having thus described the invention, what is claimed as new is:—

1. A bean cutter comprising means for cutting off the ends of beans and cutting the pods into pieces, and separate chutes below said means into which said ends and pieces drop and arranged to discharge the ends at one point and to discharge the pieces at another point.

2. A bean cutter comprising means for cutting off the ends of beans and cutting the pods into pieces, and a hopper in which said means is disposed and having chutes into which said ends and pieces drop, said chutes being arranged so that the ends are discharged toward one side and the pieces are discharged toward the opposite side.

3. A bean cutter comprising means for cutting off the ends of beans and cutting the pods into pieces, a hopper in which said means is disposed and comprising downwardly converging sides, a chute extending downwardly from one of said sides for catching the pieces and discharging them in one direction, and chutes extending downwardly from the other side of the hopper for catching the ends of the beans and discharging them in the opposite direction.

4. A bean cutter comprising a group of spaced cutting disks for simultaneously cutting off the ends of beans and cutting the pods into pieces, a chute arranged to catch said pieces and discharge them at one point, and chutes arranged to catch the ends of the beans and discharge them at other points.

In testimony whereof I hereunto affix my signature.

LILLIAN HEALD DOE.